US011524675B2

(12) United States Patent
Bryan et al.

(10) Patent No.: US 11,524,675 B2
(45) Date of Patent: Dec. 13, 2022

(54) VEHICLE AND METHOD OF WARNING A VEHICLE OPERATOR OF AN IMPENDING SHUTDOWN OF AN ELECTRICAL OUTLET ON THE VEHICLE

(71) Applicant: FORD GLOBAL TECHNOLOGIES, LLC, Dearborn, MI (US)

(72) Inventors: Seth Anthony Bryan, Royal Oak, MI (US); Rian Edman, Dearborn, MI (US); Sassan Farahmand, Canton, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 17/032,743

(22) Filed: Sep. 25, 2020

(65) Prior Publication Data

US 2022/0097675 A1  Mar. 31, 2022

(51) Int. Cl.
| | |
|---|---|
| *B60W 20/13* | (2016.01) |
| *B60W 10/08* | (2006.01) |
| *B60W 10/26* | (2006.01) |
| *B60W 10/30* | (2006.01) |
| *B60W 50/14* | (2020.01) |
| *B60W 10/06* | (2006.01) |
| *B60W 40/105* | (2012.01) |
| *B60W 10/02* | (2006.01) |

(52) U.S. Cl.
CPC .......... *B60W 20/13* (2016.01); *B60W 10/023* (2013.01); *B60W 10/06* (2013.01); *B60W 10/08* (2013.01); *B60W 10/26* (2013.01); *B60W 10/30* (2013.01); *B60W 40/105* (2013.01); *B60W 50/14* (2013.01); *B60W 2510/087* (2013.01); *B60W 2510/1005* (2013.01); *B60W 2520/00* (2013.01)

(58) Field of Classification Search
CPC .... B60W 10/023; B60W 10/06; B60W 10/08; B60W 10/26; B60W 10/30; B60W 40/105; B60W 50/14; B60W 2510/1005; B60W 2520/00; B60W 2510/087; B60W 20/13

See application file for complete search history.

(56) References Cited

U.S. PATENT DOCUMENTS

| | | | |
|---|---|---|---|
| 10,773,704 B1 * | 9/2020 | Rollinger | .............. B60W 10/06 |
| 2015/0084411 A1 | 3/2015 | Cho et al. | |

(Continued)

*Primary Examiner* — Tisha D Lewis
(74) *Attorney, Agent, or Firm* — David B Kelley; Brooks Kushman P.C.

(57) ABSTRACT

A vehicle powertrain includes a battery, an electric machine, an electrical circuit, an electrical outlet, and a controller. The electric machine is configured to receive electrical power from the battery to propel the vehicle and to deliver electrical power to the battery to recharge the battery. The electrical circuit is configured to transfer electrical power between the battery and the electric machine. The electrical outlet is configured to deliver power from the electrical circuit to an external device that is connected to the outlet. The controller is programmed to, in response to a first set of conditions that is indicative of the vehicle powertrain overheating or a second set of conditions that is indicative of an inability to charge the battery to a requested charge value, issue a warning of an impending shutdown of the electrical outlet.

20 Claims, 7 Drawing Sheets

(56) References Cited

U.S. PATENT DOCUMENTS

| | | |
|---|---|---|
| 2018/0265088 A1* | 9/2018 | Cikalo ............ B60W 30/18054 |
| 2019/0084506 A1 | 3/2019 | Gutierrez |
| 2020/0086743 A1* | 3/2020 | Jala ........................ B60L 50/60 |
| 2020/0108819 A1* | 4/2020 | Revach ................. B60W 20/13 |
| 2020/0148064 A1 | 5/2020 | Gonzales et al. |

* cited by examiner

VEHICLE AND METHOD OF WARNING A VEHICLE OPERATOR OF AN IMPENDING SHUTDOWN OF AN ELECTRICAL OUTLET ON THE VEHICLE

TECHNICAL FIELD

The present disclosure relates to vehicles having electrical outlets that provide power to one or more external devices when the external devices are plugged into the outlets.

BACKGROUND

Electrical outlets are configured to provide power to an external device when the external device is plugged into the outlet.

SUMMARY

A vehicle powertrain includes a battery, an electric machine, an electrical circuit, an electrical outlet, and a controller. The electric machine is configured to receive electrical power from the battery to propel the vehicle and to deliver electrical power to the battery to recharge the battery. The electrical circuit is configured to transfer electrical power between the battery and the electric machine. The electrical outlet is configured to deliver power from the electrical circuit to an external device that is connected to the outlet. The controller is programmed to, in response to a first set of conditions that is indicative of the vehicle powertrain overheating or a second set of conditions that is indicative of an inability to charge the battery to a requested charge value, issue a warning of an impending shutdown of the electrical outlet, wherein the first set of conditions and the second set of conditions include an electrical load of the electrical outlet exceeding a load threshold. The controller is further programmed to, in response to an expiration of a time period after issuing the warning of the impending shutdown of the electrical outlet, shutdown the electrical outlet.

A vehicle includes a battery, an electric machine, an electrical circuit, accessories, an electrical outlet, a transmission, and a controller. The electric machine is configured to receive electrical power from the battery to propel the vehicle and to deliver electrical power to the battery to recharge the battery. The electrical circuit is configured to transfer electrical power between the battery and the electric machine. The accessories are configured to draw power from the electrical circuit. The electrical outlet is configured to deliver power from the electrical circuit to an external device that is connected to the outlet. The transmission has a gear selector. The controller is programmed to, in response to a temperature of the electric machine exceeding a temperature threshold, an electrical load of the accessories exceeding a first load threshold, an electrical load of the electrical outlet exceeding a second load threshold, a vehicle speed being less than a speed threshold, and the gear selector not being in a parked position, issue a warning of an impending shutdown of the electrical outlet.

A vehicle includes an engine, a battery, an electric machine, an electrical circuit, an electrical outlet, a transmission, a torque converter, and a controller. The engine is configured to propel the vehicle. The electric machine is configured to receive electrical power from the battery to propel the vehicle and to deliver electrical power to the battery to recharge the battery. The electrical circuit is configured to transfer electrical power between the battery and the electric machine. The electrical outlet is configured to deliver power from the electrical circuit to an external device that is connected to the outlet. The transmission has a gear selector. The torque converter is configured to transfer rotational power from the engine and the electric machine to the transmission. The controller is programmed to, in response to the battery discharging electrical power, a power output limit of the electrical outlet decreasing to less than a power threshold, the engine running, an impeller speed of the torque converter decreasing to less than a speed threshold, a battery charging request exceeding a charging power threshold, the gear selector not being in a parked position, an electrical load of the electrical outlet exceeding a load threshold, and a discharging rate of the battery exceeding a discharging threshold, issue a warning of an impending shutdown of the electrical outlet.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
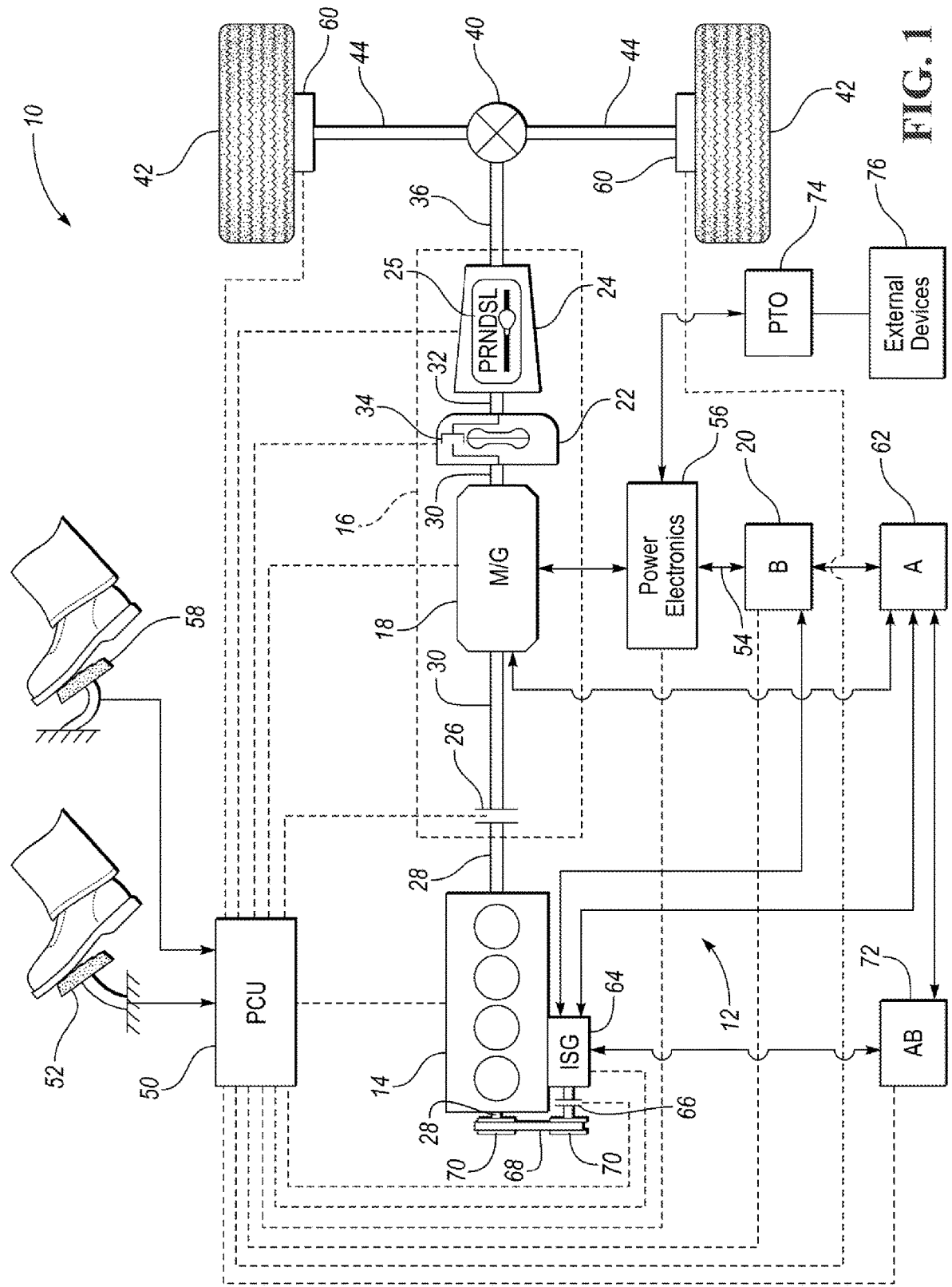
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12.

The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The transmission, or gearbox 24, may be placed in PRNDSL (park, reverse, neutral, drive, sport, low) via a transmission range or gear selector 25.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. To drive the vehicle with the M/G 18 the traction battery 20 transmits stored electrical energy through wiring 54 to the power electronics 56 that may include inverter and rectifier circuitry, for example. The inverter circuitry of the power electronics 56 may convert DC voltage from the battery 20 into AC voltage to be used by the M/G 18. The rectifier circuitry of the power electronics 56 may convert AC voltage from the M/G 18 into DC voltage to be stored with the battery 20. The controller 50 commands the power electronics 56 to convert voltage from the battery 20 to an AC voltage provided to the M/G 18 to provide positive or negative torque to shaft 30. Inverter circuitry and rectifier circuitry are disclosed in U.S. patent application Ser. No. 16/189,713, filed on Nov. 13, 2018, which is incorporated by reference herein in its entirety.

Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and/or the M/G 18 may also be configured to provide electrical power to one or more vehicle accessories 62. The vehicle accessories 62 may include, but are not limited to, climate control systems, power steering systems, radios, control interfaces, various controllers, entertainment systems (e.g., monitors, DVD players, etc.), electric heaters, or any other system or device that is electrically operated. The accessories 62 may directly draw electrical power from the battery 20 and/or the M/G 18 or may draw electrical power from the battery 20 and/or the M/G 18 via the power electronics 56.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The vehicle 10 may include a power takeoff 74 that is configured to transfer electrical power from the battery 20 via the power electronics 56 to one or more external devices 76 that are connected to the power takeoff 74. More specifically, the power the takeoff 74 may be configured to transfer power from the battery 20 via the inverter circuitry of the power electronics 56 to the one or more external devices 76 that are connected to the power takeoff 74. The power takeoff 74 may comprise one or more electrical outlets that connect the inverter circuitry of the power electronics 56 to the external devices 76. The external devices 76 may be any type of device that is configured to receive electrical power, such as power tools (e.g., saws or drills), lighting devices, air compressors, refrigeration systems, stoves, microwaves, cement mixers, etc. The system may be referred to as a "power to the box" feature that transfers electrical power from the battery 20 via the power electronics 56 to any external device.

Additionally, the M/G 18 may be configured to provide electrical power to the power takeoff 74 and any external device 76 that is connected to the power takeoff 74. The M/G 18 may also be connected to the power takeoff 74 through the power electronics 56. The controller 50 may be configured to control the amount of electric current that is being delivered from the M/G 18 and/or the battery 20 to the power takeoff 74.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

It should further be understood that the vehicle configuration described herein is merely exemplary and is not intended to be limited. Other electric or hybrid vehicle configurations should be construed as disclosed herein. Other electric or hybrid vehicle configurations may include, but are not limited to series hybrid vehicles, parallel hybrid vehicles, series-parallel hybrid vehicles, plug-in hybrid electric vehicles (PHEVs), fuel cell hybrid vehicles, battery electric vehicles (BEVs) or any other electric or hybrid vehicle configuration known to a person of ordinary skill in the art.

Figure 2:
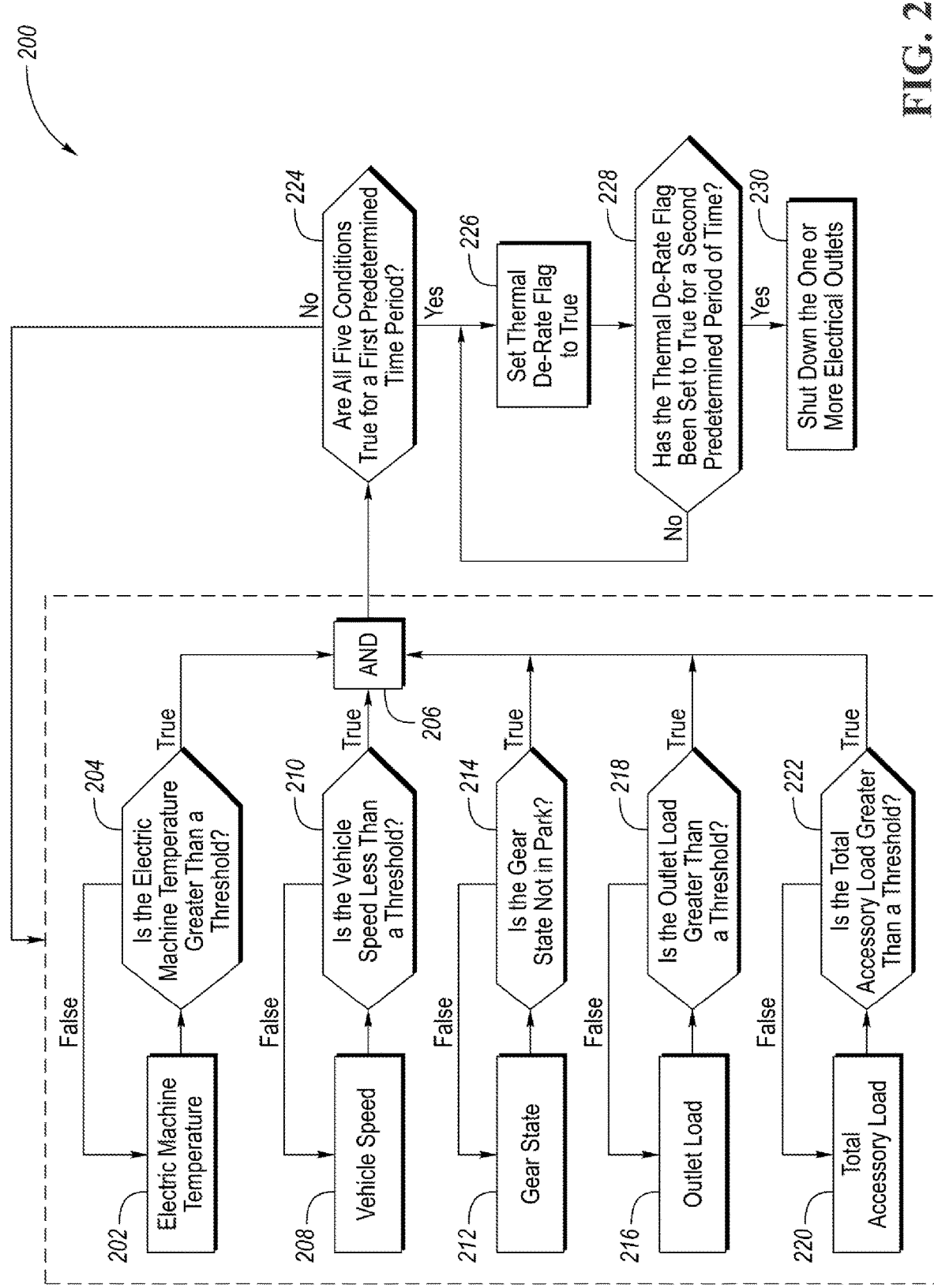
FIG. 2 is a flowchart of a first method for issuing a warning of an impending shutdown of an electrical outlet on the vehicle.

Referring to FIG. 2, a first method 200 for issuing a warning of an impending shutdown of one or more electrical outlets (e.g., the one or more outlets that comprise the power takeoff 74) on the vehicle 10 is illustrated. The method 200 may be stored as control logic and/or an algorithm within the controller 50. The controller 50 may implement the method 200 by controlling the various components of the vehicle 10. The method 200 may be initiated by turning a start key or ignition of the vehicle 10 to an "on" position. The method 200 may consider a first set of conditions. When the first set of conditions are "true" it may be indicative of the vehicle powertrain overheating, which may result in shutting down or cutting off the electrical power being delivered to the one or more electrical outlets of the power takeoff 74.

The method 200 determines if a temperature of the electric machine (e.g., M/G 18) is greater than a first temperature threshold at blocks 202 and 204. The temperature of the electric machine may be measured via a temperature sensor at block 202 (which may then be communicated to controller 50) and whether or not the temperature of the electric machine is greater than the first temperature threshold is determined at block 204. If the temperature of the electric machine is not greater than the first temperature threshold, block 202 continues to measure the temperature of the electric machine at block 202. If the temperature of the electric machine is greater than the first temperature threshold, block 204 outputs a "true" signal, which is input into AND block 206.

The method 200 also determines if a vehicle speed (e.g., the speed of vehicle 10) is less than a speed threshold at blocks 208 and 210. The speed of the vehicle 10 may be measured via speeds sensors at the wheels 42 or via any other know method (e.g., via changes in a position measured via a global positioning system) at block 208 (which may then be communicated to controller 50) and whether or not the speed of the vehicle 10 is less than the speed threshold is determined at block 210. If the speed of the vehicle 10 is not less than the speed threshold, block 208 continues to measure the speed of the vehicle 10. If the speed of the vehicle 10 is less than the speed threshold, block 210 outputs a "true" signal, which is input into AND block 206.

The method 200 also determines if a transmission (e.g., gearbox 24) is not in park (e.g., if the gear selector has been adjusted to any gear state other than park such as reverse, neutral, drive, sport, low, etc.) at blocks 212 and 214. The position of the gear selector 25 may be determined at block 212 (which may then be communicated to controller 50) and whether or not the gear selector 25 is not in park is determined at block 214. If it is determined that the gear selector 25 is in park, block 212 continues to communicate the position of the gear selector 25 to the controller 50. If it is determined that the gear selector 25 is in not park, block 214 outputs a "true" signal, which is input into AND block 206.

The method 200 also determines if the loads (e.g., the electrical power being drawn from the battery 20 and/or the M/G 18 via the power electronics 56) of the one or more outlets (e.g., the electrical outlets at the power takeoff 74) on the vehicle 10 are greater than a first load threshold at blocks 216 and 218. The load of the one or more outlets may refer to average electrical load over a preset window of time. The loads of the one or more outlets may be determined via measuring the electrical current and voltage being delivered over the power electronics 56 to the one or more outlets via current and voltage sensors at block 216 (which may then be communicated to controller 50) and whether or not the loads of the one or more outlets are greater than the first load threshold is determined at block 218. If the loads of the one or more outlets are not greater than the first load threshold, block 216 continues to measure the loads of the one or more outlets. If the loads of the one or more outlets are greater than the first load threshold, block 218 outputs a "true" signal, which is input into AND block 206.

The method 200 also determines if the total accessory load (e.g., the electrical power being drawn from the battery 20, accessory battery 72, and/or the M/G 18 from the vehicle accessories 62, which may or may not be via the power electronics 62) is greater than a second load threshold at blocks 220 and 222. The total accessory load threshold may refer to an average electrical load over a preset window of time. It should be noted that the total accessory load may include the combined loads of the vehicle accessories 62 and the power takeoff 74, which includes the electrical outlets. The total accessory load may be determined via measuring the electrical current and voltage being delivered to the vehicle accessories 62 via current and voltage sensors at block 220 (which may then be communicated to controller 50) and whether or not the total accessory load is greater than the second load threshold is determined at block 222. If the total accessory load is not greater than the second load threshold, block 220 continues to measure the total accessory load. If the total accessory load is greater than the second load threshold, block 222 outputs a "true" signal, which is input into AND block 206.

If AND block 206 has received "true" signals from all five blocks 204, 210, 214, 218, and 222, the method 200 moves on to block 224 where it is determined if the "true" signals from all five blocks 204, 210, 214, 218, and 222 have been maintained for a first predetermined period of time. If the "true" signal from one or more of the five blocks 204, 210, 214, 218, and 222 is not maintained for the first predetermined period of time at block 224, the method 200 returns to performing the operations of blocks 202 through 222. If the "true" signals from all of the five blocks 204, 210, 214, 218, and 222 are maintained for the first predetermined period of time at block 224, the method 200 moves on to block 226, where a thermal de-rate flag is set to "true." The thermal de-rate flag may include issuing a warning of an impending shutdown of the one or more electrical outlets at the power takeoff 74. The warning may be visual (e.g., it may be issued via illuminating a light on a dashboard or control panel, or may be issued as written text on a control screen or human machine interface), audible (e.g., a warning sound or spoken warning over speakers within the vehicle), or haptic (e.g., a vibration on a seat or a steering wheel of the vehicle).

Figure 3:
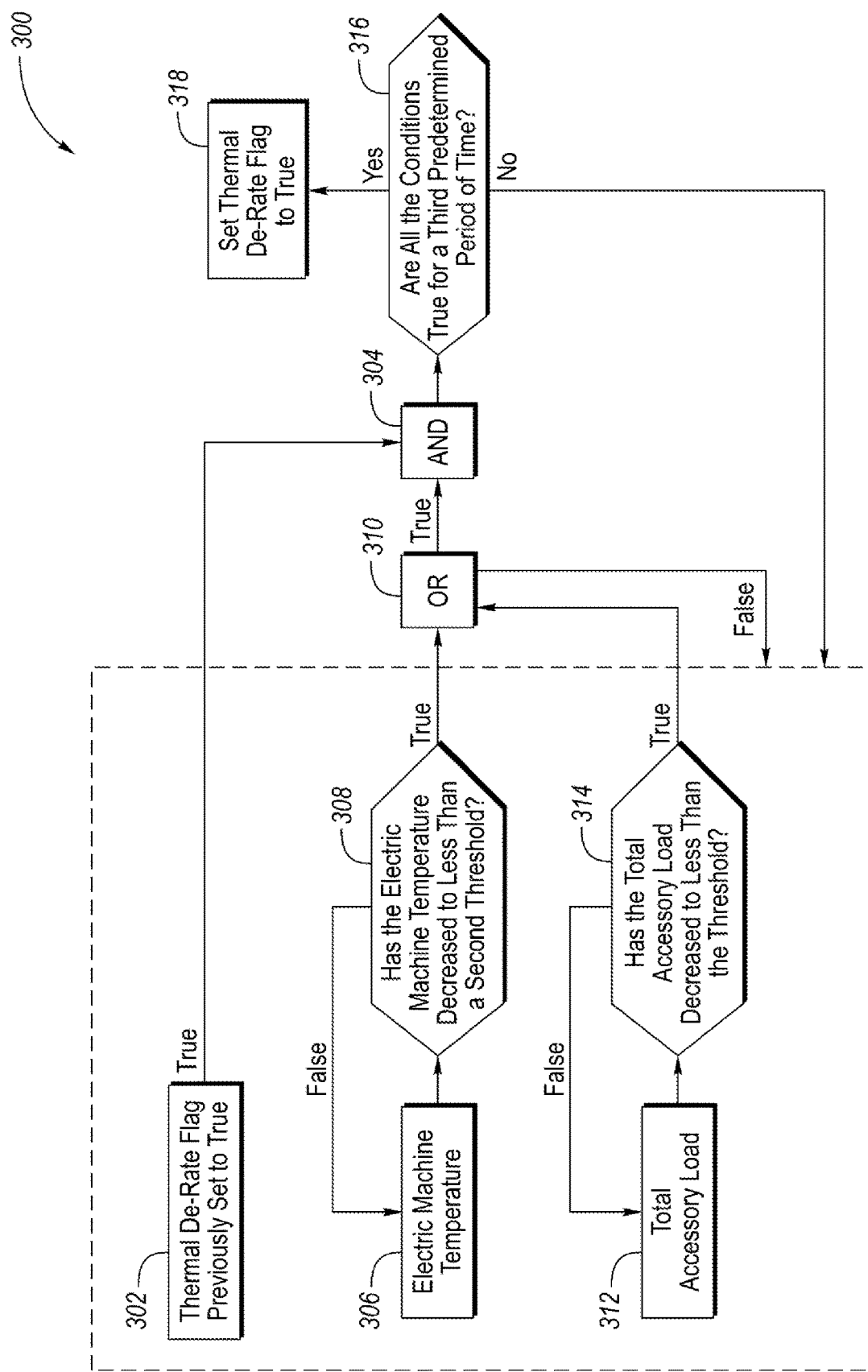
FIG. 3 is a flowchart of a method for withdrawing the warning of the impeding shutdown of the electrical outlet.

Next, the method 200 next moves on to block 228 where it is determined if the thermal de-rate flag has been set to "true" for a second predetermined period of time. If the thermal de-rate flag has not been set to has been set to "true" for a second predetermined period of time, the method 200 may remain at block 228 until the second predetermined period of time expires or until the thermal de-rate flag changes from "true" to "false." If the thermal de-rate flag changes from "true" to "false," the method 200 returns to performing the operations of blocks 202 through 222. Such a method of transitioning the thermal de-rate flag from "true" to "false" is illustrated in FIG. 3. If the thermal de-rate flag remains "true" and the second predetermined period of time expires at block 228, the method 200 moves on to block 230, where the one or more electrical outlets at the power takeoff 74 are shutdown.

It should be understood that the flowchart in FIG. 2 is for illustrative purposes only and that the method 200 should not be construed as limited to the flowchart in FIG. 2. Some of the steps of the method 200 may be rearranged while others may be omitted entirely.

Referring to FIG. 3, a method 300 for transitioning the thermal de-rate flag from "true" to "false" and withdrawing the warning of the impeding shutdown of the electrical outlet that was issued according to method 200 is illustrated. The method 300 may be stored as control logic and/or an algorithm within the controller 50. The controller 50 may implement the method 300 by controlling the various components of the vehicle 10. The method 300 may be initiated once the thermal de-rate flag is set to "true" at block 226 in method 200. First, the "true" setting of the thermal de-rate flag is input into from block 302 into AND block 304.

The method 300 then determines if the temperature of the electric machine (e.g., M/G 18) has decreased to less than a second temperature threshold at blocks 306 and 308 (after having increased to greater than the first temperature threshold at block 204 in method 200). The temperature of the electric machine may be measured via a temperature sensor at block 306 (which may then be communicated to controller 50) and whether or not the temperature of the electric machine has decreased to less than the second temperature threshold is determined at block 308. If the temperature of the electric machine has not decreased to less than the second temperature threshold, block 306 continues to measure the temperature of the electric machine. If the temperature of the electric machine has decreased to less than the second temperature threshold, block 308 outputs a "true" signal, which is input into OR block 310. The second temperature threshold may be less than the first temperature threshold in order to allow a hysteresis between setting the thermal de-rate flag to "true" and transitioning the thermal de-rate flag from "true" to false."

The method 300 also determines if the total accessory load has decreased to less than the second load threshold at blocks 312 and 314 (after having increased to greater than the second load threshold at block 222 in method 200). The total accessory load may be determined via measuring the electrical current and voltage being delivered to the vehicle accessories 62 via current and voltage sensors at block 312 (which may then be communicated to controller 50) and whether or not the total accessory load has decreased to less than the second load threshold is determined at block 314. If the total accessory load has not decreased to less than the second load threshold, block 312 continues to measure the total accessory load. If the total accessory load has decreased to less than the second load threshold, block 314 outputs a "true" signal, which is input into OR block 314.

If either block 308 or block 314 is inputting a "true" signal into OR block 310, OR block 310 outputs a "true" signal into AND block 304. If both block 308 and block 314 are not inputting a "true" signal into OR block 310, the method 300 continues to perform the operations of blocks 302, 306, 308, 312, and 314. If AND block 304 has received "true" signals from both blocks 302 and 310, the method 300 moves on to block 316 where it is determined if the "true" signals from both blocks 302 and 310 have been maintained for a third predetermined period of time. If the "true" signals from both blocks 302 and 310 are not maintained for the third predetermined period of time at block 316, the method 300 returns to performing the operations of blocks 302, 306, 308, 312, and 314. If the "true" signals from both blocks 302 and 310 are maintained for the third predetermined period of time at block 316, the method 300 moves on to block 318, where the thermal de-rate flag is set from "true" to "false." Setting the thermal de-rate flag from "true" to "false" may include retracting or withdrawing the warning of the impending shutdown of the one or more electrical outlets at the power takeoff 74 that was issued at block 226 in method 200.

It should be understood that the flowchart in FIG. 3 is for illustrative purposes only and that the method 300 should not be construed as limited to the flowchart in FIG. 3. Some of the steps of the method 300 may be rearranged while others may be omitted entirely.

Figure 4:
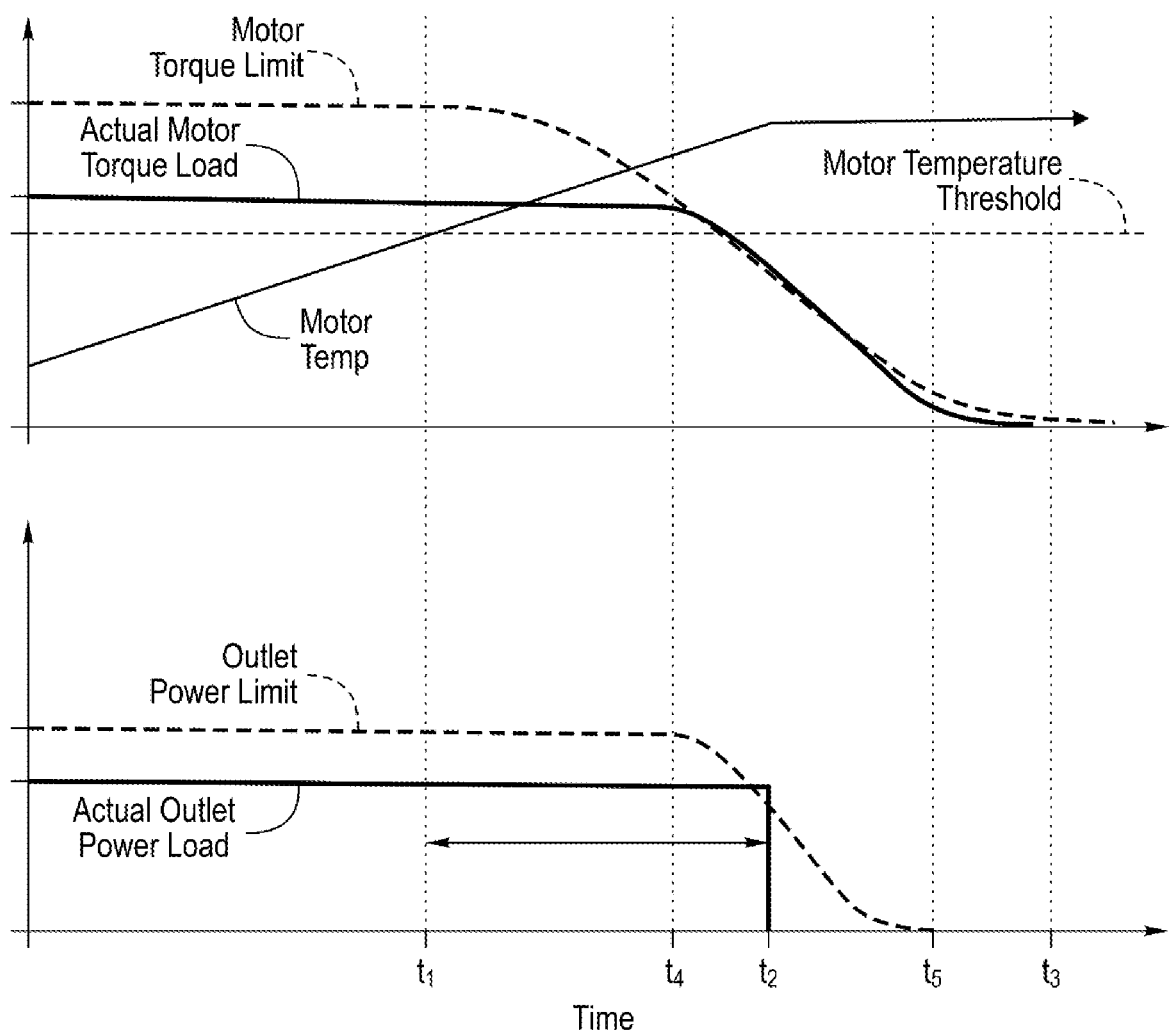
FIG. 4 is a series of graphs illustrating the relationship between various factors, including the temperature of the electric machine and the electrical power being delivered to the electrical outlet before, during, and after a shutdown of the electrical outlet.

Referring to FIG. 4, a series of graphs of the relationship between various factors, including the temperature of the electric machine, and the electrical power being delivered to the electrical outlet before, during, and after a shutdown of the electrical outlet are illustrated. At time $t_1$, the temperature of the electric machine (e.g., M/G 18) reaches at temperature threshold and begins to increase beyond the temperature threshold between times $t_1$ and $t_2$. Also, time $t_1$ may correspond to a time where the thermal de-rate flag is set to "true" and the warning of an impending shutdown of the one or more electrical outlets at the power takeoff 74 is issued. During the time period between times $t_1$ and $t_3$, a motor torque limit is decreased, and the actual motor torque load may also be decreased such the actual motor torque load does not exceed the motor torque limit. Also, at time $t_4$, which occurs after time $t_1$ but before time $t_2$, the power limits of the one or more electrical outlets (i.e., the maximum power that may be delivered to the to the one or more electrical outlets at the power takeoff 74) are gradual reduced to zero at time $t_5$. At some point after $t_4$ (i.e., time $t_2$ in this example), the actual power load being delivered to the one or more electrical outlets is reduced to zero and the one or more outlets at the power takeoff 74 are shutdown.

The time between issuing the warning of an impending shutdown of the one or more electrical outlets at the power takeoff 74 and shutting down the one or more electrical outlets at the power takeoff 74 (i.e., the time period between $t_1$ and $t_2$), may be calibrated based on a temperature of the electric machine that allows a sufficient period of time to warn the operator before the outlets are shutdown so that operator may adjust any of the operating parameters (e.g. reduce the load on the M/G 18 to decrease M/G 18 temperature, adjust the vehicle speed, adjust the gear state, adjust the load at the outlet, and/or adjust the total accessory load) to prevent the shutdown of the one or more electrical outlets at the power takeoff 74 from occurring.

Figure 5A:
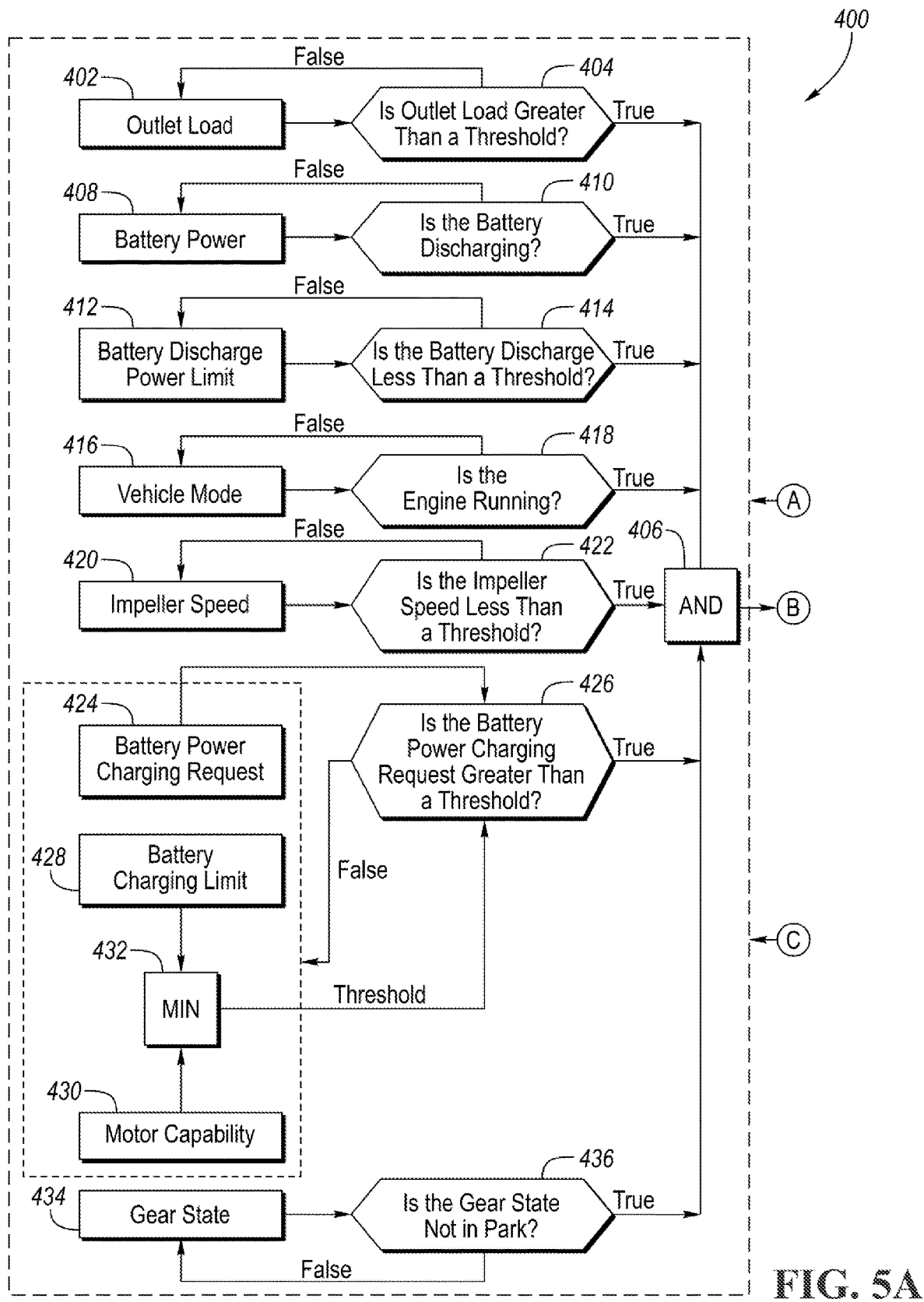
FIGS. 5A and 5B include a flowchart of a second method for issuing a warning of an impending shutdown of an electrical outlet on the vehicle.
Figure 5B:
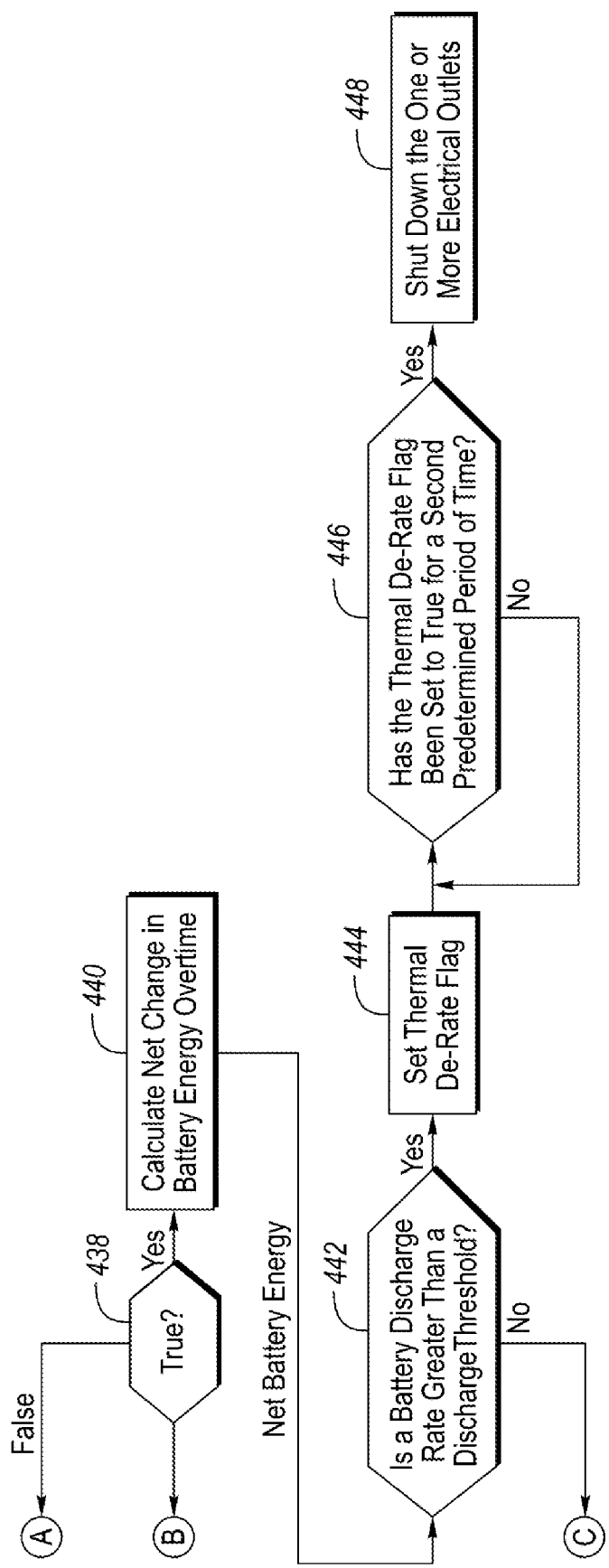

Referring to FIGS. 5A and 5B, a second method 400 for issuing a warning of an impending shutdown of an electrical outlet (e.g., the one or more outlets that comprise the power takeoff 74) on the vehicle 10 is illustrated. The method 400 may be stored as control logic and/or an algorithm within the controller 50. The controller 50 may implement the method 400 by controlling the various components of the vehicle 10. The method 400 may be initiated by turning a start key or ignition of the vehicle 10 to an "on" position. The method 400 may consider a second set of conditions. When the second set of conditions are "true" it may be indicative of a failure to maintain a desired state of charge of the battery 20 at a desired level due to an excessive discharging load on the battery, which may result in shutting down or cutting off the electrical power being delivered to the one or more electrical outlets of the power takeoff 74.

The method 400 determines if the loads (e.g., the electrical power being drawn from the battery 20 and/or the M/G 18 via the power electronics 56) of one or more outlets (e.g., the electrical outlets at the power takeoff 74) on the vehicle 10 are greater than a load threshold at blocks 402 and 404. The load of the one or more outlets may refer to average electrical load over a preset window of time. The loads of the one or more outlets may be determined via measuring the electrical current and voltage being delivered over the power electronics 56 to the one or more outlets via current and voltage sensors at block 402 (which may then be communicated to controller 50) and whether or not the loads of the one or more outlets are greater than the load threshold is determined at block 404. If the loads of the one or more outlets are not greater than the load threshold, block 402 continues to measure the loads of the one or more outlets. If the loads of the one or more outlets are greater than the load threshold, block 404 outputs a "true" signal, which is input into AND block 406.

The method 400 also determines if the battery 20 is discharging power at blocks 408 and 410. Whether or not the battery 20 is discharging power or receiving a charging power (i.e., the battery 20 being recharged via the M/G 18) may be determined based on the amount of electrical power going into or out of battery 20. The amount of electrical power going into or out of battery 20 may be determined at block 408 via measuring the electrical current and voltage being delivered over the power electronics 56 to or from the battery 20 via current and voltage sensors (which may then be communicated to controller 50) and whether or not the battery 20 is discharging power is determined at block 410. If the battery 20 is not discharging power, block 408 continues to measure the amount of electrical power going into and/or out of the battery 20. If the battery 20 is discharging power, block 410 outputs a "true" signal, which is input into AND block 406.

The method 400 also determines if a discharge limit of the battery 20 (i.e., a maximum value at which the battery 20 is able to output power) is less than a threshold. The discharge limit of the battery 20 may be adjusted based on several factors and may be adjusted based on an algorithm that is stored in the controller 50. For Example, as the temperature of the M/G 18 increases or as the state of charge of the battery 20 decreases, the controller 50 may decrease the battery discharge limit to prevent overheating of the M/G 18 or to maintain a minimum charge level of the battery 20, respectively. The discharge limit of the battery 20 is determined at block 412 and whether or not the battery discharge limit is less than a threshold is determined at block 414. If the battery discharge limit is not less than a threshold, block 412 continues to determine the battery discharge limit. If the battery discharge limit is less than a threshold, block 414 outputs a "true" signal, which is input into AND block 406.

The method 400 also determines if the engine 14 is operating or running at blocks 416 and 418. Block 416 determines the mode of operation of the vehicle 10, which may include an engine only mode (i.e., a mode where the engine 14 is operating alone to provide power), an electric mode (i.e., a mode where the M/G 18 is operating alone to provide power), or a hybrid mode (i.e., a mode where both the engine 14 and the M/G 18 are operating to provide power). Whether or not the engine 14 is operating or running is determined at block 418. If the engine 14 is not operating or running, block 416 continues to determine the mode of operation of the vehicle 10. If the engine 14 is operating or running, block 418 outputs a "true" signal, which is input into AND block 406.

The method 400 also determines if an impeller speed of the torque converter 22 is less than a threshold speed at blocks 420 and 422. Block 420 determines the impeller speed of the torque converter 22 and whether or not the impeller speed of the torque converter 22 is less than the threshold speed is determined at block 422. The speed of the impeller of the torque converter 22 (i.e., rotation speed of the impeller) may be measured via a speed sensor (which may then be communicated to controller 50). If the impeller speed of the torque converter 22 is not less than the threshold speed, block 420 continues to determine the impeller speed of the torque converter 22. If the impeller speed of the torque converter 22 is less than the threshold speed, block 422 outputs a "true" signal, which is input into AND block 406.

The method 400 also determines if a battery power charging request (i.e., a rate at which the battery is requesting charging power) is greater than a threshold at blocks 424 and 426. Block 424 determines the battery power charging request, which may be a function to maintain a battery charge above a desired threshold or may be a function of recapturing energy (e.g., regenerative braking). Such functions may be stored as algorithms within the controller 50 and such power charging requests may be commanded by the controller 50. Whether or not the battery power charging request is greater than the threshold is determined at block 426. The threshold for the battery power charging request may be a maximum value or limit at which the battery 20 may receive power from the M/G 18 (determined at block 428) or may be a maximum value or limit at which the M/G 18 may deliver electric power to the battery 20 (determined at block 430), which in turn is based on the torque limits and/or speed limits of the M/G 18. The minimum of the values determined at blocks 428 and 430 is then input into block 426 from block 432 as the threshold for the battery power charging request. If the battery power charging request is not greater than the threshold, blocks 424, 428, 430, and 432 continue to operate to determine the battery power charging request and the threshold value for the battery charging request. If the battery power charging request is greater than the threshold, block 426 outputs a "true" signal, which is input into AND block 406.

The method 400 also determines if a transmission (e.g., gearbox 24) is not in park (e.g., if the gear selector has been adjusted to any gear state other than park such as reverse, neutral, drive, sport, low, etc.) at blocks 434 and 436. The position of the gear selector 25 may be determined at block 434 (which may then be communicated to controller 50) and whether or not the gear selector 25 is not in park is determined at block 436. If it is determined that the gear selector 25 is in park, block 434 continues to communicate the position of the gear selector 25 to the controller 50. If it is determined that the gear selector 25 is in not park, block 436 outputs a "true" signal, which is input into AND block 406.

If AND block 406 has received "true" signals from all seven blocks 404, 410, 414, 418, 422, 426, and 436, the method 400 moves on to block 438 where it is determined if the "true" signals from all seven blocks 404, 410, 414, 418, 422, 426, and 436 have been maintained. Such maintenance may or may not require a first predetermined period of time. If the "true" signals from one or more of the seven blocks 404, 410, 414, 418, 422, 426, and 436 are not maintained at block 438, the method 400 returns to performing the operations of blocks 402 through 436. If the "true" signals from all of the seven blocks 404, 410, 414, 418, 422, 426, and 436 are maintained at block 438, the method 400 moves on to block 440 where the net change in stored battery energy over a period of time or over preset time window is calculated. If the net change is an increase in stored energy within the battery 20, then the rate at which the battery is being charged is greater than the rate at which the battery is being discharged (i.e., the state of charge is increasing). If the net change is a decrease in stored energy within the battery 20, then the rate at which the battery is being discharged is greater than the rate at which that battery is being charged (i.e., the state of charge is decreasing).

Next the method 400 moves on to block 442 where it is determined if the battery 20 is discharging at a rate that is greater than a discharge threshold. If the battery 20 is charging or if the battery is discharging at a rate that is not greater than the discharge threshold, the method 400 returns to performing the operations of blocks 402 through 436. If the battery 20 is discharging at a rate that is greater than the discharge threshold, the method 400 moves on to block 444, where a thermal de-rate flag is set to "true." The thermal de-rate flag may include issuing a warning of an impending shutdown of the one or more electrical outlets at the power takeoff 74. The warning may be visual (e.g., it may be issued via illuminating a light on a dashboard or control panel, or may be issued as written text on a control screen or human machine interface), audible (e.g., a warning sound or spoken warning over speakers within the vehicle), or haptic (e.g., a vibration on a seat or a steering wheel of the vehicle).

Next, the method 400 moves on to block 446 where it is determined if the thermal de-rate flag has been set to "true" for a period of time, which may or may not be a second predetermined period of time. If the thermal de-rate flag has not been set to has been set to "true," the method 400 may remain at block 446 until the second predetermined period of time expires, until the thermal de-rate flag changes from "true" to "false," or until some other condition (e.g., the state of charge of the battery 20 decreasing to less than a threshold, the M/G 18 temperature increasing to greater than a threshold, etc.) becomes "true" requiring a shutdown of the one or more electrical outlets at the power takeoff 74, If the thermal de-rate flag changes from "true" to "false," the method 400 returns to performing the operations of blocks 402 through 436. Such a method of transitioning the thermal de-rate flag from "true" to "false" is illustrated in FIG. 3. If the thermal de-rate flag remains "true" for a period of time or if some other condition becomes "true" requiring a shutdown of the one or more electrical outlets at the power takeoff 74, the method 400 moves on to block 448, where the one or more electrical outlets at the power takeoff 74 are shutdown.

It should be understood that the flowchart in FIGS. 5A and 5B is for illustrative purposes only and that the method 400 should not be construed as limited to the flowchart in FIGS. 5A and 5B. Some of the steps of the method 400 may be rearranged while others may be omitted entirely.

Figure 6:
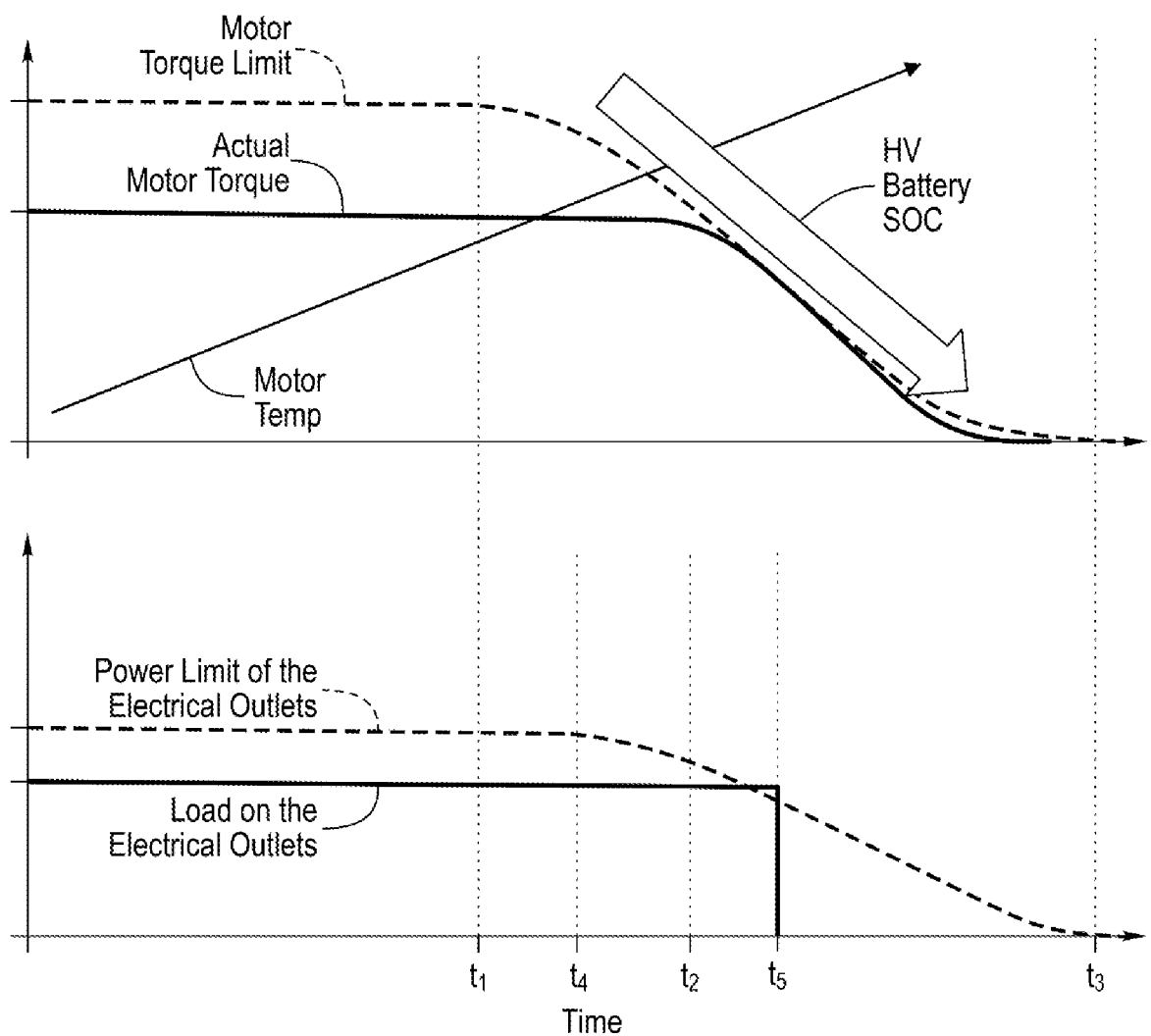
FIG. 6 is a series of graphs illustrating the relationship between various factors, including the state of charge of the battery and the electrical power being delivered to the electrical outlet before, during, and after a shutdown of the electrical outlet.

Referring to FIG. 6, a series of graphs of the relationship between various factors, including the state of charge of the battery, and the electrical power being delivered to the electrical outlet before, during, and after a shutdown of the electrical outlet are illustrated. At time $t_1$, the temperature of the electric machine (e.g., M/G 18) reaches a temperature threshold and begins to increase beyond the temperature threshold. Slightly after time $t_1$, the state of charge of the battery 20 also begins to decrease. At time $t_2$, the state of charge of the battery 20 has decreased to an undesirable level (i.e., to a level that is less than a desirable threshold). Time $t_2$ also corresponds to a time where the thermal de-rate flag is set to "true" and the warning of an impending shutdown of the one or more electrical outlets at the power takeoff 74 is issued. During the time period between times $t_1$ and $t_3$, a motor torque limit is decreased, and the actual motor torque load may also be decreased such the actual motor torque load does not exceed the motor torque limit. Starting at time $t_4$, which occurs after time $t_1$ but before time $t_2$, the power limits of the one or more electrical outlets (i.e., the maximum power that may be delivered to the to the one or more electrical outlets at the power takeoff 74) are gradual reduced to zero at time $t_3$. At some point after $t_2$ (i.e., time $t_5$ in this example), the actual power load being delivered to the one or more electrical outlets is reduced to zero and the one or more outlets at the power takeoff 74 are shutdown.

The time between issuing the warning of an impending shutdown of the one or more electrical outlets at the power takeoff 74 and shutting down the one or more electrical outlets at the power takeoff 74 (i.e., the time period between $t_2$ and $t_5$), may be calibrated based on a state of charge of the battery 20 that allows a sufficient period of time to warn the operator before the outlets are shutdown so that operator may adjust any of the operating parameters (e.g. reduce the load on the M/G 18, adjust the load at the outlet, and/or adjust the total accessory load, etc.) to prevent the shutdown of the one or more electrical outlets at the power takeoff 74 from occurring.

It should be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle powertrain comprising:
   a battery;
   an electric machine configured to receive electrical power from the battery to propel the vehicle and to deliver electrical power to the battery to recharge the battery;
   an electrical circuit configured to transfer electrical power between the battery and the electric machine;
   an electrical outlet configured to deliver power from the electrical circuit to an external device that is connected to the outlet; and
   a controller programmed to,
      in response to a first set of conditions that is indicative of the vehicle powertrain overheating or a second set of conditions that is indicative of an inability to charge the battery to a requested charge value, issue a warning of an impending shutdown of the electrical outlet, wherein the first set of conditions and the second set of conditions include an electrical load of the electrical outlet exceeding a load threshold, and
      in response to an expiration of a time period after issuing the warning of the impending shutdown of the electrical outlet, shutdown the electrical outlet.

2. The vehicle powertrain of claim 1, wherein the first set of conditions includes a temperature of the electric machine exceeding a temperature threshold.

3. The vehicle powertrain of claim 1 further comprising accessories configured to draw power from the electrical circuit, and wherein the first set of conditions includes an electrical load of the accessories exceeding a second load threshold.

4. The vehicle powertrain of claim 1, wherein the first set of conditions includes a vehicle speed being less than a speed threshold.

5. The vehicle powertrain of claim 1, wherein the second set of conditions includes the battery discharging electrical power.

6. The vehicle powertrain of claim 1, wherein the second set of conditions includes a power output limit of the electrical outlet decreasing to less than a power threshold.

7. The vehicle powertrain of claim 1 further comprising an engine, and wherein the second set of conditions includes the engine running.

8. The vehicle powertrain of claim 1 further comprising a torque converter, and wherein the second set of conditions includes an impeller speed of the torque converter decreasing to less than a speed threshold.

9. The vehicle powertrain of claim 1, wherein the second set of conditions includes a battery charging request exceeding a charging capacity.

10. The vehicle powertrain of claim 1, wherein the second set of conditions includes a state of charge of the battery decreasing to less than a threshold during battery charging.

11. A vehicle comprising:
a battery;
an electric machine configured to receive electrical power from the battery to propel the vehicle and to deliver electrical power to the battery to recharge the battery;
an electrical circuit configured to transfer electrical power between the battery and the electric machine;
accessories configured to draw power from the electrical circuit;
an electrical outlet configured to deliver power from the electrical circuit to an external device that is connected to the outlet;
a transmission having a gear selector; and
a controller programmed to, in response to a temperature of the electric machine exceeding a temperature threshold, an electrical load of the accessories exceeding a first load threshold, an electrical load of the electrical outlet exceeding a second load threshold, a vehicle speed being less than a speed threshold, and the gear selector not being in a parked position, issue a warning of an impending shutdown of the electrical outlet.

12. The vehicle of claim 11, wherein the controller is further programmed to, in response to an expiration of a preset time period after issuing the warning of the impending shutdown of the electrical outlet, shutdown the electrical outlet.

13. The vehicle of claim 11, wherein the controller is further programmed to, in response to the temperature of the electric machine decreasing to less than a second temperature threshold and the electrical load of the accessories decreasing to less than the first load threshold, withdraw the warning of the impeding shutdown of the electrical outlet.

14. The vehicle of claim 13, wherein the second temperature threshold is less than the first temperature threshold.

15. The vehicle of claim 11, wherein the electrical load of the accessories is an average electrical load over a preset window of time.

16. The vehicle of claim 11, wherein the electrical load of the electrical outlet is an average electrical load over a preset window of time.

17. A vehicle comprising:
an engine configured to propel the vehicle;
a battery;
an electric machine configured to receive electrical power from the battery to propel the vehicle and to deliver electrical power to the battery to recharge the battery;
an electrical circuit configured to transfer electrical power between the battery and the electric machine;
an electrical outlet configured to deliver power from the electrical circuit to an external device that is connected to the outlet;
a transmission having a gear selector;
a torque converter configured to transfer rotational power from the engine and the electric machine to the transmission; and
a controller programmed to, in response to the battery discharging electrical power, a power output limit of the electrical outlet decreasing to less than a power threshold, the engine running, an impeller speed of the torque converter decreasing to less than a speed threshold, a battery charging request exceeding a charging power threshold, the gear selector not being in a parked position, an electrical load of the electrical outlet exceeding a load threshold, and a discharging rate of the battery exceeding a discharging threshold, issue a warning of an impending shutdown of the electrical outlet.

18. The vehicle of claim 17, wherein the charging power threshold is a maximum value at which the battery may receive power from the electric machine.

19. The vehicle of claim 17, wherein the charging power threshold is a maximum value at which the electric machine may deliver electric power to the battery.

20. The vehicle of claim 17, wherein the electrical load of the electrical outlet is an average electrical load over a preset window of time.

* * * * *